United States Patent Office 3,574,202
Patented Apr. 6, 1971

3,574,202
NOVEL NITROFURAN DERIVATIVE AND A PROCESS FOR THE PRODUCTION THEREOF
Ichiro Hirao and Yasuhiko Kato, Kitakyushu-shi, and Ryuzo Ueno, Nishinomiya-shi, Japan, assignors to Kabushiki Kaisha Ueno Seiyaku Oyo Kenkyujo, Osaka, Japan
No Drawing. Filed May 9, 1967, Ser. No. 637,061
Claims priority, application Japan, May 13, 1966, 41/30,527; July 21, 1966, 41/47,294; Feb. 7, 1967, 42/7,571; Feb. 28, 1967, 42/12,988, 42/12,989
Int. Cl. C07d 85/54
U.S. Cl. 260—240.1        4 Claims

---

ABSTRACT OF THE DISCLOSURE

A nitrofuran derivative having the formula

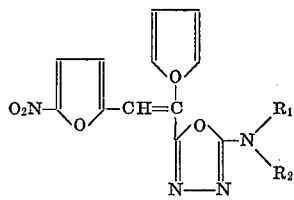

wherein each of $R_1$ and $R_2$ is hydrogen or acyl group derived lower fatty acid, or both of $R_1$ and $R_2$ are hydroxy methyl group; and process for preparation of said nitrofuran derivative comprising reacting $\beta$-(5-nitro-2-furyl)-$\alpha$-(2'-furyl)-acryloyl hydrazine with cyanogen halide, and if desired reacting the product with acylating agent, said nitrofuran derivatives are useful as chemotherapeutic agent, antiseptic, food preservative and additive to livestock feed.

---

This invention relates to a novel nitrofuran derivative and a process for the production thereof, further relating to a microorganism inhibitor containing said novel nitrofuran derivative.

An object of this invention is to provide a novel nitrofuran derivative having a very high inhibiting action to a broad range of microorganism, at the same time, showing a relatively low toxicity, therefore, useful as a chemotherapeutic agent, an antiseptic, a food preservative and an additive to a livestock feed.

According to this invention, a novel nitrofuran derivative represented by the general formula

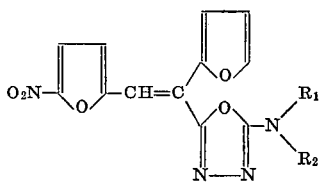

is provided. In said general formula, each of $R_1$ and $R_2$ is a member selected from the class consisting of hydrogen, an acyl group derived from a lower fatty acid and hydroxy methyl group, when said member is hydroxy methyl group, both of $R_1$ and $R_2$ are hydroxy methyl group. As said acyl group derived from a lower fatty acid, formyl group, acetyl group, butanoyl group and mono-, di- or tri-chloroacetyl groups may be cited.

According to this invention, of the compounds of said general formula, 5-[2'-(5''-nitro-2''-furyl)-1'-(2'''-furyl)vinyl]-2-amino-1,3,4-oxadiazole is obtained by reacting $\beta$-(5-nitro-2-furyl)-$\alpha$-(2'-furyl)acryloyl hydrazine with a cyanogen halide. Said reaction may be easily carried out by heating a mixture of the two materials to 40–150° C., preferably 40–100° C. in the presence of an inert solvent for 1–2 hours. As said cyanogen halide, cyanogen chloride or cyanogen iodide may be used. On the other hand, $\beta$-(5-nitro-2-furyl)-$\alpha$-(2'-furyl)acryloyl hydrazine is obtainable from $\beta$-(5-nitro-2-furyl)-$\alpha$-(2'-furyl)acrylic acid by a process known per se.

Further, according to this invention, of the compounds of said general formula, 5-[2'-(5''-nitro-2''-furyl)-1'-(2'''-furyl)vinyl]-2-acylamino-1,3,4-oxadiazole is obtained by reacting 5-[2'(5''-nitro-2''-furyl) - 1' - (2'''-furyl)vinyl]-2-amino-1,3,4-oxadiazole obtained by the aforementioned reaction with an acylating agent of a lower fatty acid. As said acylating agent, a lower fatty acid anhydride and an acid halide may be used. As said lower fatty acid anhydride, acetic anhydride, propionic anhydride, butyric anhydride, monochloroacetic anhydride, dichloroacetic anhydride and trichloroacetic anhydride may be cited. On the other hand, as an acid halogenide of a lower fatty acid, formyl chloride, acetyl chloride, propionyl chloride, butanoyl chloride, monochloroacetyl chloride, dichloroacetyl chloride and trichloroacetyl chloride may be cited. This reaction varies depending upon the kind of the acylating agent used, however, it may be easily carried out generally by heating a mixture of the two reactants to 50–200° C., preferably 70–200° C. for 30 minutes to several hours. At this time, the reaction may be carried out in the presence of an inert solvent such as dioxane, benzene, toluene and xylene, or an excess acylating agent, for instance, an acid anhydride may be used as a reaction medium. The reaction may be carried out in the absence of a catalyst also, however, in case an acid halide is used as an acylating agent, it is preferable to use an acid binder such as an alkali metal bicarbonate or carbonate, dimethyl aniline, triethyl amine and pyridine.

Furthermore, according to this invention, of the compounds of said general formula 5-[2'(5''-nitro-2''-furyl)-1'-(2'''-furyl)vinyl]-2-[bis - (hydroxymethyl) - amino]-1,3,4-oxadiazole is obtained by reacting 5-[2'-(5''-nitro-2''-furyl) - 1' - (2'''-furyl)vinyl]-2-amino-1,3,4 - oxadiazole obtained by the aforementioned reaction, with hydroxy methylating agent selected from the group consisting of formaldehyde, paraformaldehyde, and a compound forming formaldehyde under reaction conditions, for instance, polyoxymethylene. This reaction may be easily carried out by using an inert solvent such as dimethyl formamide, dioxane and tetrahydrofuran or an excess formaldehyde as a medium and heating the two reactants to 40–150° C., preferably 50–100° C. for 30 minutes to several hours. It is preferable to use at least 2 moles of hydroxy methylating agent to 5-[2'-(5''-nitro-2''-furyl)-1'-(2'''-furyl)vinyl]-2-amino-1,3,4-oxadiazole.

The novel nitrofuran derivatives of this invention display excellent anti-fungal property to a broad range of microorganism, having a less toxicity as compared with a known nitrofuran derivative, for instance, 5-nitro-2-furyl acryl amide.

The minimum growth inhibiting concentration ($\mu$g./ml.) of the novel nitrofuran derivative of this invention to various microorganisms and the lethal dose for 50% of the test animals ($LD_{50}$ mg./kg.) when the novel nitrofuran derivative of this invention were orally administered to mouse and those of 5-nitro-2-furyl-acryl amide as control are shown in the following Table 1. For information, the minimum growth inhibiting concentration is a value concerning microorganisms cultivated in TSB land whose pH was adjusted to 7.2 and each bacteria was incubated at 37° C. for 48 hours.

When the microorganism inhibitor of this invention is used for the purpose of antiseptic of food, it is preferable to dissolve the same in a liquid carrier such as water, a saline solution, an aqueous solution of saccharoid, alcohol

TABLE 1

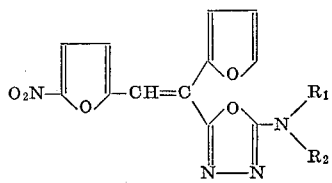

| The minimum growth inhibiting concentration, μg./ml. | Nitrofuran derivative number | | | | | | | Control, 5-nitro-2-furyl-acrylamide |
|---|---|---|---|---|---|---|---|---|
| | I | II | III | IV | V | VI | VII | |
| R₁ | H | COCH₃ | COC₂H₅ | COC₃H₇ | COCH₂Cl | COCH₃ | CH₂OH | |
| R₂ | H | H | H | H | H | COCH₃ | CH₂OH | |
| Diplococcus pneumoniae, Dp-1 | <0.15 | 0.31 | | | | 5 | 20 | <0.15 | |
| Streptococcus hemolyticus, A 089 | 0.62 | 0.62 | 0.62 | 0.62 | 1.2 | 5 | <0.15 | 10 |
| Staphylococcus aureus, 209 P | 0.39 | 0.78 | 0.78 | 0.78 | 1.5 | 10 | 0.78 | 6.25 |
| Bacillus subtilis, PCI 219 | <0.19 | 1.56 | 0.78 | 0.39 | <0.2 | 3 | <0.2 | 3.13 |
| Salmonella enteritidis, 1891 | 1.56 | 6.25 | 3.13 | 6.25 | 1.5 | >25 | 0.78 | |
| Salmonella pulloroum, Nakahara 114 | 0.78 | 3.13 | 6.25 | 3.13 | 6.0 | >25 | 0.78 | |
| Escherichia coli, 0-55 | 3.13 | 6.25 | 3.13 | 3.03 | 3.0 | 5 | 1.56 | 6.25 |
| Klebsiella pneumoniae, ST-101 | 3.13 | 6.25 | 12.5 | 6.25 | 0.8 | >25 | 0.39 | |
| Proteus vulgaris, HX-19 | 1.56 | 3.13 | 6.25 | 6.25 | 6.0 | >25 | 3.13 | 25 |
| Pseudmonas aeruginosa, Iijima | <0.19 | 3.13 | 3.13 | 1.56 | 3.0 | 10 | 1.56 | 25 |
| LD₅₀, mg./kg | | >12,000 | >12,000 | >12,000 | 3,300 | | 1,600 | 680 |

As will be apparent from the foregoing results, the novel nitrofuran derivative of this invention shows a strong antibacterial action to a broad range of microorganism, especially showing a strong anti-bacterial action to a gram-negative bacteria such as *Proteus vulgaris* and *Pseudomonas aeruginosa* and its toxicity is considerably low as compared with the known nitrofuran derivative, therefore, it is especially useful as a chemotherapeupic agent, an antiseptic, a food preservative or as an effective component of a microorganism inhibitor such as an additive to a livestock feed.

Namely, according to this invention, a microorganism inhibitor containing as an effective component, a nitrofuran derivative represented by the general formula

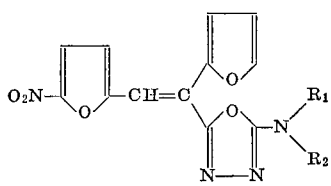

wherein R₁ and R₂ have meanings as defined above is provided.

Said effective component besides can be used singly, may be used in combination with various known carries and assistants in accordance with uses of the inhibitor.

For instance, for use as a chemotherapeutic agent an effective amount of the active compound of this application is administered into a human or animal body together with known non-toxic carriers for preparing medicines in, for instance, powdery, liquid or other various forms of administration, for instance, orally or otherwise. The administering amount considerably varies depending upon the objective symptom of therapy, age and weight of one who is to be administered, frequency of therapy and kind of the compound, however, it is generally preferable to use 25–500 mg. as a dose. As non-toxic carriers for oral administration, there are aqueous solution, syrup and a viscous solution for medicine such as gum arabic, animal or vegetable oil, gelatin capsule, collapsible pill and tablet substrate. Also as carriers for administration by injection, there are water, salt water and an aqueous solution of saccharoid.

and glycerol or mix the same with a solid medium such as sugar, e.g., lactose, starch and hardened oil.

For instance, in preservation of fresh fish, by immersing the fish in a brine solution containing 5–10 p.p.m. of said compound, it was possible to preserve freshness of the fish for 24–72 hours. In the case of wheat-gluten, similarly by adding 5–10 p.p.m. of said effective component, decomposition due to growth of *Bacillus subtilis* could be inhibited for about 24 hours. Similarly, in the case of milk by adding 0.5–10 p.p.m. of said effective component, growth of *Escherichia coli* in the milk could be inhibited thereby extending preserving period by 2–3 days. In the case of bean-curd, a bagged bean-curd could be preserved for 1 week to 3 months by the use of 2–4 p.p.m., while in the case of an ordinary bean-curd its freshness could be maintained for 4–20 hours by the use of 5–10 p.p.m. In the case of fish sausage, preservation for 2–3 months became possible by the use of 2.5–20 p.p.m., while in the case of meat sausage by the use of 5–10 p.p.m., that the preservation period could be extended by 7–10 days was observed. In the case of boiled fish-paste, by the use of 1–2 p.p.m. as compared with a control the preservation period could be extended by 24 hours and by the combined use with sorbic acid the result was more effective.

In case, the microorganism inhibitor of this invention is used for prevention of sickness or medical treatment of livestocks, similar to the case of medicinal use, one may use the effective component by properly increasing or decreasing the administering amount. For instance, chickens fed with feed containing 100 p.p.m. of said compound could prevent occurrence of coccidiosis by more than 80%. Also chickens fed with water containing 5 p.p.m. of said compound could prevent pullorum disease (white diarrhea) by 100%. When a 5% suspension of the active component was injected into the teats of cows suffering from mammitis, the curing ratio was more than 80%.

The following examples were given for the purpose of illustrating the present invention, and are not intended to be limiting on the scope thereofe.

EXAMPLE 1

5-[2′(5″-nitro-2″-furyl)-1′-(2‴-furyl)vinyl]-2-amino-1,3,4-oxadiazole

A mixture of 41.5 grams (0.158 mol) of β-(5-nitro-2-furyl)-α-(2′-furyl)acryloyl hidrazine, 25.0 grams (0.236 mol) of cyanogenbromide and 2 liters of methanol was gradually heated under reflux for 1 hour. The reaction mixture was cooled by ice and salt mixture, the separated precipitate was filtered, washed with water and dried. On the other hand, the filtrate was diluted with 2 liters of water, left to stand under cooling, the separated precipitate was filtered, washed with water and dried. The combined precipitates of the objective crude nitrofuran derivative amounted to 39.0 grams. Subsequently, said derivative was recrystallized from dioxane to obtain orange red needle crystals [melting point: 219–220° C. (decomposition)].

Analysis.—Calcd. for $C_{12}H_8N_4O_5$ (percent): C, 50.01; H, 2.80; N, 19.44. Found (percent): C, 49.78; H, 2.87; N, 19.36.

EXAMPLE 2

5-[2'-(5''-nitro - 2''-furyl) - 1'-(2-'''-furyl)vinyl] - 2-acetamido-1,3,4 - oxadiazole and 5-[2'-(5''-nitro-2''-furyl)-1'-(2'''-furyl)vinyl]-2-diacetamido-1,3,4-oxadiazole 14.4 grams (0.05 mol) of 5-[2'-(5''-nitro-2''-furyl)-1'-(2'''-furyl)vinyl]-2-amino-1,3,4 - oxadiazole obtained according to the process of Example 1 were heated and refluxed for 30 minutes in 20 ml. of acetic anhydride, thereafter cooled by ice and salt mixture. The separated precipitate was filtered, washed with methanol and dried. 8.0 grams of precipitate were obtained. Subsequently it was recrystallized from dioxane to obtain yellowish orange crystals (melting point: 236–7° C.), of said acetamido derivatives.

Analysis.—Calcd. for $C_{14}H_{10}N_4O_6$ (percent): C, 50.91; H, 3.05; N, 16.96. Found (percent): C, 51.32; H, 3.14; N, 17.28.

The mother liquor obtained by filtering said reaction product was added into 30 ml. of methanol and the mixture was left to stand overnight. The separated crystals were filtered, recrystallized from "Methyl Cellosolve" to obtain 4.0 grams of yellow crystals of said diacetamido derivative (decomposition point: 215° C.).

Analysis.—Calcd. for $C_{16}H_{12}N_4O_7$ (percent): C, 51.62; H, 3.25; N, 15.05. Found (percent): C, 51.52; H, 3.43; N, 15.23.

EXAMPLE 3

5-[2'-(5''-nitro-2''-furyl)-1'-(2'''-furyl)vinyl]-2-propionamido-1,3,4-oxadiazole A mixture of 14.4 grams (0.05 mol) of 5-[2'-(5''-nitro-2''-furyl) - 1'-(2'''-furyl)vinyl]-2-amino-1,3,4-oxadiazole obtained by the process according to Example 1, 9.75 grams of propionic anhydride and 500 ml. of dioxane was heated and refluxed for 1 hour. The resultant solution was added to 5.5 liters of water and the mixture was left to stand. The separated precipitate was filtered, washed with water to obtain 13.5 grams of the objective crude nitrofuran derivative. Subsequently, said derivative was recrystallized from methanol to obtain yellowish orange crystals (melting point 199–201° C.).

Analysis.—Calcd. for $C_{15}H_{12}N_4O_6$ (percent): C, 52.33; H, 3.51; N, 16.27. Found (percent): C, 52.02; H, 3.46; N, 16.38.

EXAMPLE 4

5-[2'-(5''-nitro-2''-furyl)-1'-(2'''-furyl)vinyl]-2-butanoylamido-1,3,4-oxadiazole A mixture of 14.4 grams (0.05 mol) of 5-[2'-(5''-nitro-2''-furyl)-1'-(2'''-furyl)vinyl]-2-amino-1,3,4 - oxadiazole; 11.3 grams of butyric anhydride and 500 ml. of dioxane was heated and refluxed for 1 hour. To the resultant solution 9.5 liters of water was added, the mixture was left to stand. The separated precipitate was filtered, washed with water and dried to obtain 12.7 grams of the objective crude nitrofuran derivative. Subsequently said derivative was recrystallized from methanol to obtain yellowish orange crystals (melting point: 159–160° C.).

Analysis.—Calcd. for $C_{16}H_{14}N_4O_6$ (percent): C, 53.63; H, 3.94; N, 15.64. Found (percent): C, 53.35; H, 4.21; N, 15.82.

EXAMPLE 5

5-[2'-(5''-nitro-2''-furyl)-1'-(2'''-furyl)vinyl]-2-chloroacetamido-1,3,4-oxadiazole A mixture of 14.4 grams of 5-[2'-(5''-nitro-2''-furyl)-1'-(2'''-furyl)vinyl]-2-amino-1,3,4-oxadiazole, 25.9 grams of monochloroacetic anhydride and 150 ml. of dioxane was heated and refluxed for 1 hour. The resultant solution was concentrated under a reduced pressure. The separated precipitate was filtered, washed with water and dried. On the other hand, the filtrate was added to water to decompose monochloroacetic anhydride. Thereafter the separated precipitate was washed with water and dried. The combined precipitates of the objective crude nitrofuran derivative amounted to 14.4 grams. Subsequently, said derivative was recrystallized from methanol to obtain yellow crystals (melting point: 213–4° C.). Ultraviolet absorption spectrum of the product in ethanol was found to be maximum at wavelength of 405 m$\mu$.

Analysis.—Calcd. for $C_{14}H_9N_4O_6Cl$ (percent): C, 46.09; H, 2.46; N, 15.36. Found (percent): C, 46.32; H, 2.56; N, 15.28.

EXAMPLE 6

5-[2'-(5''-nitro-2''-furyl)-1'-(2'''-furyl)vinyl]-2-[bis(hydroxymethyl)amino]-1,3,4-oxadiazole A mixture of 10 grams of 5-[2'-(5''-nitro-2''-furyl)-1'-(2'''-furyl)vinyl]-2-amino - 1,3,4 - oxadiazole, 25 ml. of 37% formalin and 10 ml. of dimethyl formamide was heated to 90–95° C. for 30 minutes. After completion of the reaction, into 300 ml. of ice water the resultant solution was poured under mechanical stirring. Thereafter the mixture was left to stand. The separated crystalline precipitate was filtered, sufficiently washed with cold water, thereafter dried in a vacuum desiccator to obtain 10.8 grams of orange crystalline powder [melting point (decomposition) 115° C.]. Ultraviolet absorption spectrum of the product in ethanol was found to be maximum at wavelength of 707 m$\mu$.

Analysis.—Calcd. for $C_{14}H_{12}N_4O_7$ (percent): C, 48.28; H, 3.48; N, 16.09. Found (percent): C, 48.37; H, 3.43; N, 16.21.

EXAMPLE 7

In Example 6, instead of 25 ml. of a 37% formalin, 10 grams of paraformaldehyde were used. 10.5 grams of the objective product as in Example 6 were obtained.

In the following Examples 8–14, explanations will be made about preparations of the microorganism inhibitor of this invention.

EXAMPLE 8

With 10 grams each of the compounds II, V and VII shown in Table 1, 89.9 grams of lactose and 0.1 gram of "Tween 20" were separately mixed to prepare 3 kinds of powdery agent. When used for the purpose of preserving bean-curd, to 2 liters of soy bean solution heated to 80–90° C., 0.1 gram of any one of the aforesaid three powdery agents was thrown in and stirred. In the case of fish sausage, to 1 kilogram of minced fish flesh, 0.1 gram of any one of the aforesaid three powdery agents was added, and the mixture was kneaded and stirred.

EXAMPLE 9

The compound VII shown in Table 1 was dissolved in propylene glycol so that the compound might become 0.5% to prepare a liquid agent. For the purpose of preserving fresh fish, 10 ml. of this liquid agent was added to 10 liters of brine and when rapidly stirred, the brine solution of the compound VII was obtained.

EXAMPLE 10

Each of the compounds V and VII shown in Table 1 was separately suspended in water together with bentonite, carboxy methyl cellulose and saccharose so that concentration might become 2% to prepare two suspensions. Upon use, any one of the two suspensions was diluted 10 times by water and scattered to plants.

EXAMPLE 11

The compounds I, II, III, IV, V, VI and VII shown in Table 1 were respectively dissolved in 20 times by weight of dimethyl formamide to prepare seven liquid agents. Upon use, each of the seven liquid agents was diluted 10,000 times by a plant cultivating liquid.

EXAMPLE 12

The compounds V and VII shown in Table 1 were respectively finely divided together with kaolin and talc to prepare two 10% powdery agents. Upon use, any one of the 2 powdery agents was mixed with domestic fowls feed at a ratio of 1 gram of the former to 2 kilograms of the latter. Also it is possible to scatter any one of the 2 powdery agents in air so as to be contained in inspiration of domestic fowls thereby preventing an epidemic.

EXAMPLE 13

With the compound V of Table 1, α-starch was mixed to prepare a 10% powder medicine. Upon preventing or curing of disease of "Yellow tail" (cultured fish), 10 grams of this medicine were mixed with 10 kilograms of the feed and thrown to the fish. The medicine did not break away from the feed in sea-water and was eaten by fish. The curing ratio of the fish disease by this method reached more than 80-90%.

EXAMPLE 14

With lecithin stearyl monoglyceride and cetyl alcohol, the compound VII of Table 1 was mixed and kneaded to prepare a cream containing 10% of the mixture, which was further admixed with fat or glycerol to obtain a cosmetic by the conventional means.

EXAMPLE 15

To minced fish fleshes of fish sausage (consisting of 40% of whale, 30% of tuna, 20% of croaker and 10% of Alaska pollack), 10% of starch was added, to which the compounds I, II, V and VII of Table 1 dissolved in small amounts of propylene glycol were added respectively, the mixture was sufficiently mixed, filled in a vinylidene chloride casing, which was boiled at 90° C. for 45 minutes to make products. The result of preserving the products at 37° C. were shown in Table 2, wherein numerators showed number of rotten products while denominators showed total number of tested products in a zone.

TABLE 2

| | Days | | | |
|---|---|---|---|---|
| | 10 | 20 | 30 | 40 |
| Zone: | | | | |
| I Compound I, 10 p.p.m | 0/20 | 0/20 | 3/20 | 4/20 |
| II, Compound II, 10 p.p.m | 0/20 | 0/20 | 0/20 | 0/20 |
| III, Compound V, 10 p.p.m | 0/20 | 1/20 | 2/20 | 4/20 |
| IV, Compound VII, 5 p.p.m | 0/20 | 0/20 | 0/20 | 2/20 |
| Control, non-added | 20/20 | | | |

EXAMPLE 16

(A) A horse-mackerel (about 12 cm. long) immediately after being caught was immersed in sea-water containing respectively 5 p.p.m. of the compound I or II in Table 1 for 20 minutes, preserved at 4° C. and the amount of volatile basic nitrogen in the fish was measured by Conway's diffusion analysis. The results were shown in Table 3.

TABLE 3

| | Days | | | |
|---|---|---|---|---|
| | 0 | 2 | 4 | 6 |
| | Milligrams percent | | | |
| Zone: | | | | |
| I, Compound I | 9.2 | 18.2 | 27.5 | 94.2 |
| II, Compound II | 9.2 | 16.5 | 27.4 | 101.8 |
| Control, non-added | 9.8 | 27.5 | 58.0 | 156.5 |

(B) Mackerel immediately after being caught (about 35 cm. long) were immersed in salt-water containing 5 p.p.m. of the compound VII of Table 1 or 7.5 p.p.m. of the compound V of Table 1 together with ice in an amount same as that of the sea-water, the mackerel thus immersed were transported from the place where they were caught for 70 hours, entered a harbor and unloaded. Thereafter these mackerel were stored at 2-4° C. inside a refrigerator, and the amounts of volatile basic nitrogen (mg. percent) in the fishes were measured everyday by Conway's diffusion analysis. The results were shown in Table 4.

TABLE 4

| | Number of storing days | | | |
|---|---|---|---|---|
| | 0 | 2 | 4 | 6 |
| Compound: | | | | |
| VII, 5 p.p.m | 11.2 | 17.5 | 29.4 | 71.5 |
| V, 7.5 p.p.m | 10.1 | 18.8 | 33.8 | 94.6 |
| Control, non-added | 12.1 | 24.1 | 61.7 | 129.8 |

EXAMPLE 17

Young chickens soon after they were born are weak in resistance, sensitive not only to contagion of a virus, but also to stress due to change of temperature and administration of a vermicide, because of that various diseases are brought about at high ratios. Of these diseases, there are pullorum disease (white diarrhea), Salmonella disease and coccidiosis.

When 100 p.p.m. each of the compounds I and II of Table 1 was added to the feed of chickens thereby raising the resistance of the chickens, attack of coccidiosis and Salmonella disease was prevented, and ratio of survival could be advanced as shown in Table 5.

TABLE 5.—RATIO OF SURVIVAL PERCENT

Zone I (Compound I) _____ 94.5
Zone II (Compound II) _____ 95.5
Control (non-added) _____ 79.7

EXAMPLE 18

When cucumbers of 4-leaf kind grew 50-70 cm., were accommodated in a vinyl house at a temperature of 37° C. and a humidity of 70-75%, 100 p.p.m. suspensions of the compounds I, II, V and VII of Table 1 were sprayed to each cucumber at 9 a.m. every other day and occurring ratio of an epidemic (Phytophthora fungus) was observed. As shown in Table 6, the results were that at non-treated zone there was 100% occurrence of the epidemic while the ratios of occurrence of the cucumbers at treated zones were only 10-25% and preventing effects of the epidemic were apparently observed. Number of tested cucumbers at each zone was 20.

TABLE 6

| | Process of occurrence, (day) | | | | | | Occurring ratio, percent |
|---|---|---|---|---|---|---|---|
| | 4 | 6 | 8 | 10 | 12 | 14 | |
| Zone: | | | | | | | |
| I, (Compound I) | | | | 1 | | 1 | 10 |
| II, (Compound II) | | | 1 | | 2 | | 15 |
| III, (Compound V) | | | 1 | 2 | | 1 | 20 |
| IV, (Compound VIII) | | | | | 1 | 1 | 10 |
| Control, non-added | 2 | 4 | 4 | 5 | 3 | 2 | 100 |

EXAMPLE 19

To minced fish fleshes for boiled fish paste (consisting of White croaker, Yellow croaker, Lizard fish, conger and shark), the compound V or VII of Table 1 dissolved in dimethyl sulfoxide and added at ratios of 1.25, 2.5, 5.0 and 10.0 p.p.m. to which further 10% of starch, 10% of water and a small amount of sodium chloride were added to prepare boiled fish pastes. Boiling was carried out for about 40 minutes. The products were preserved at 30° C., the preservable periods of these products were as shown in Table 7.

TABLE 7

| Compound: | Adding amount, p.p.m. | Preserved period, hours |
|---|---|---|
| VII | 1.25 | 48 |
|  | 2.5 | 64 |
|  | 5.0 | 72 |
|  | 10.0 | 98 |
| V | 1.25 | 40 |
|  | 2.5 | 40 |
|  | 5.0 | 64 |
|  | 10.0 | 72 |
| Control, non-added |  | 40 |

EXAMPLE 20

The respiratory diseases of chickens occur throughout the year and once occurred whenever new chickens are purchased, they are infected each time.

In this experiment 100 male chickens of lordhorn (phonetic) 12 days after they were born were used, as virus, 0.1 ml. of mixed culture fluid of *Hemophilus gallinalum* and *Mycoplasma galsepticum* was dropped into the nasal cavities of these chickens to infect them. To a part of the chickens the compound VII or V of Table 1 was orally administered, while to the remaining chickens said compound was injected into muscles as suspension and by existence or otherwise of said inoculated bacteria inside nasal cavities, the tracheas and air sacs, the effects were adjudicated. The results were as shown in Table 8. The percentage in the table showed cured ratio (bacteria-negative) of the chickens.

TABLE 8

|  | Degree of effect, percent | | |
|---|---|---|---|
|  | 50 | 75 | 100 |
| Compound: |  |  |  |
| VII, p.p.m. | 25 | 200 | 300 |
| V | 100 | 400 | 800 |

What is claimed is:
1. A nitrofuran derivative having the general formula

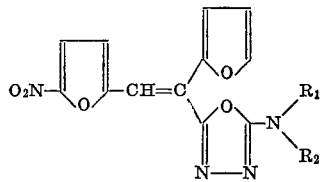

wherein each of $R_1$ and $R_2$ is a member selected from the class consisting of hydrogen, an acyl group derived from a lower fatty acid and a hydroxy methyl group and when said member is a hydroxy methyl group, both of $R_1$ and $R_2$ are a hydroxy methyl group.

2. 5 - [2'-(5''-nitro-2''-furyl)-1'-(2'''-furyl)vinyl] - 2-amino-1,3,4-oxadiazole.

3. 5 - [2'-(5''-nitro-2''-furyl)-1'-(2'''-furyl)vinyl] - 2-acetamido-1,3,4-oxadiazole.

4. 5 - [2'-(5''-nitro-2''-furyl)-1'-(2'''-furyl)vinyl] - 2-[bis-(hydroxymethyl)-amino]-1,3,4-oxadiazole.

References Cited

UNITED STATES PATENTS

| 3,260,716 | 7/1966 | Takai et al. | 260—240 |
| 3,303,188 | 2/1967 | Takai et al. | 260—240 |
| 3,337,541 | 8/1967 | Haraoka et al. | 260—240 |

OTHER REFERENCES

Miura et al.: Yakugaku Sasshi, vol. 83, pp. 778 to 780 (1963).

Burger: Medicinal Chemistry, vol. 1, p. 46, Interscience Publishers, Inc. (N.Y.) (1951).

Hirao: Nippon Kagaku Zasshi, vol. 88, pp. 574–5 (May 1967).

Index Chemicus, vol. 19, No. 6, issue 136, No. 58974 (12/6/65).

JOHN D. RANDOLPH, Primary Examiner

U.S. Cl. X.R.

99—2, 4, 158, 160; 260—240; 424—272